H. M. JACKLIN.
ROTARY INTERNAL COMBUSTION ENGINE.
APPLICATION FILED FEB. 16, 1912.

1,095,730.

Patented May 5, 1914.

Fig. 1.

H. M. JACKLIN.
ROTARY INTERNAL COMBUSTION ENGINE.
APPLICATION FILED FEB. 16, 1912.

1,095,730.

Patented May 5, 1914.
8 SHEETS—SHEET 3.

Fig. 3.

Witnesses
O. B. Baenziger
J. Otto Baenziger

Inventor
Harold M. Jacklin
By E. S. Wheeler
Attorney.

H. M. JACKLIN.
ROTARY INTERNAL COMBUSTION ENGINE.
APPLICATION FILED FEB. 16, 1912.

1,095,730.

Patented May 5, 1914.

H. M. JACKLIN.
ROTARY INTERNAL COMBUSTION ENGINE.
APPLICATION FILED FEB. 16, 1912.

1,095,730.

Patented May 5, 1914.

Fig. 7.

UNITED STATES PATENT OFFICE.

HAROLD M. JACKLIN, OF LANSING, MICHIGAN, ASSIGNOR OF ONE-HALF TO JEREMIAH JACKLIN, OF LANSING, MICHIGAN.

ROTARY INTERNAL-COMBUSTION ENGINE.

1,095,730. Specification of Letters Patent. Patented May 5, 1914.

Application filed February 16, 1912. Serial No. 677,928.

*To all whom it may concern:*

Be it known that I, HAROLD M. JACKLIN, a citizen of the Dominion of Canada, residing at Lansing in the county of Ingham, State of Michigan, have invented certain new and useful Improvements in Rotary Internal-Combustion Engines; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to rotary internal combustion engines, and consists in the construction and arrangement of parts hereinafter more fully set forth and pointed out particularly in the claims.

The main object of the invention is to produce a comparatively simple and inexpensive construction of the character described wherein provision is made for employing vibratory sector pistons which alternately act as abutments and as power developing factors, provision being made for transmitting movement from said sectors to the eccentric shaft.

A further object is to provide for primarily compressing the explosive charge before admitting it in to the combustion cylinder, and again compressing said charge after introduction into the combustion cylinder prior to ignition, and a further object is to provide for cooling the engine by air.

The above objects are attained by the mechanism illustrated in the accompanying drawings, in which:—

Figure 1:
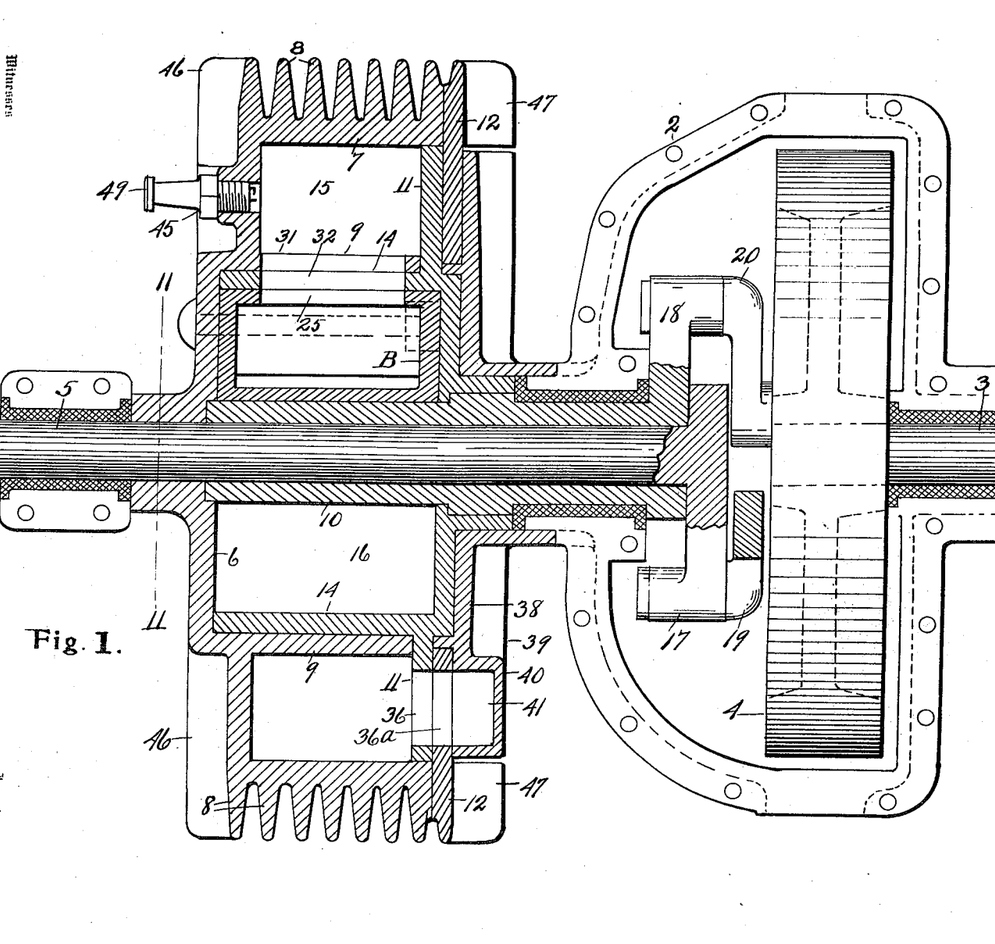
Figure 1 is a horizontal section through an engine involving my invention, the upper part of the case in which is located the wheel on the eccentric driven shaft, the crank arms and links connecting the concentric shafts of the engine thereto being removed, and said arms and one of the connecting links being partly in section.
Figure 2:
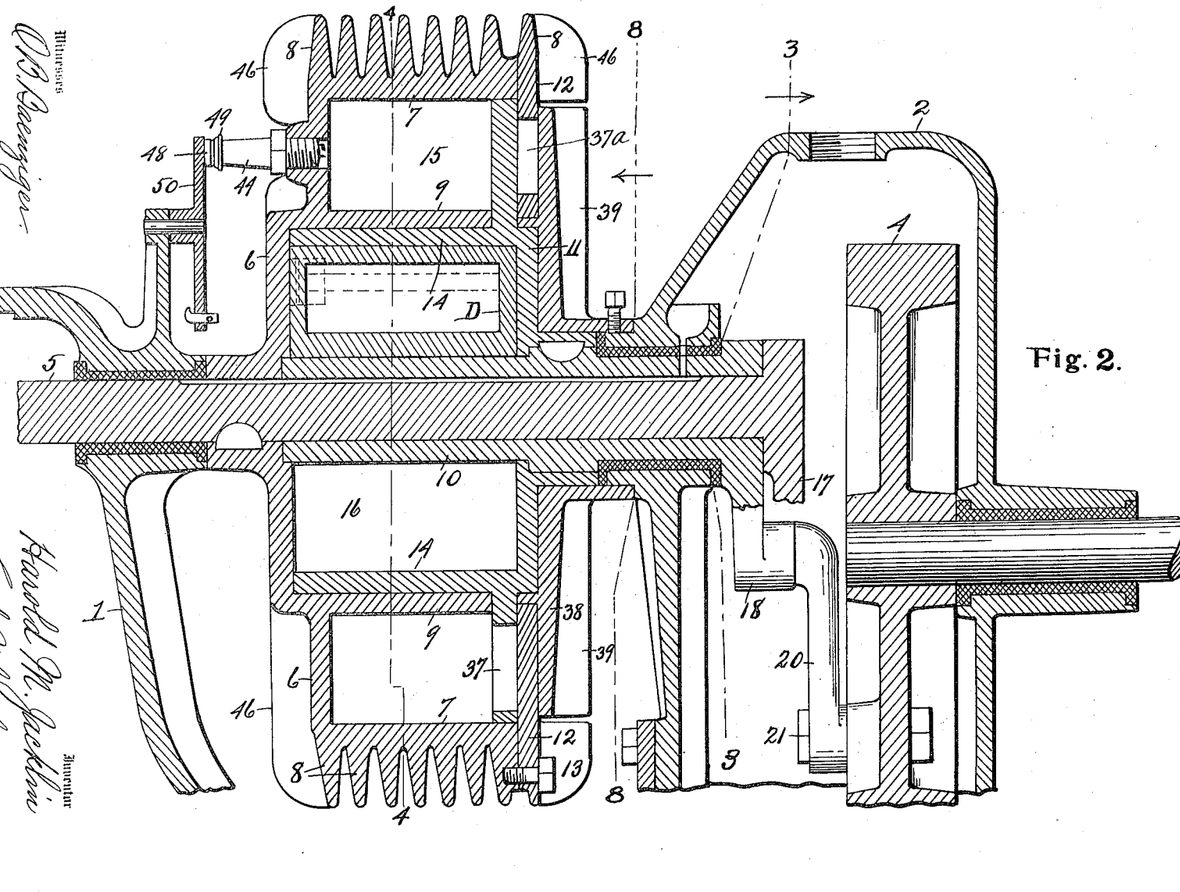
Fig. 2 is a vertical section in a plane at right angles to Fig. 1.
Figure 3:
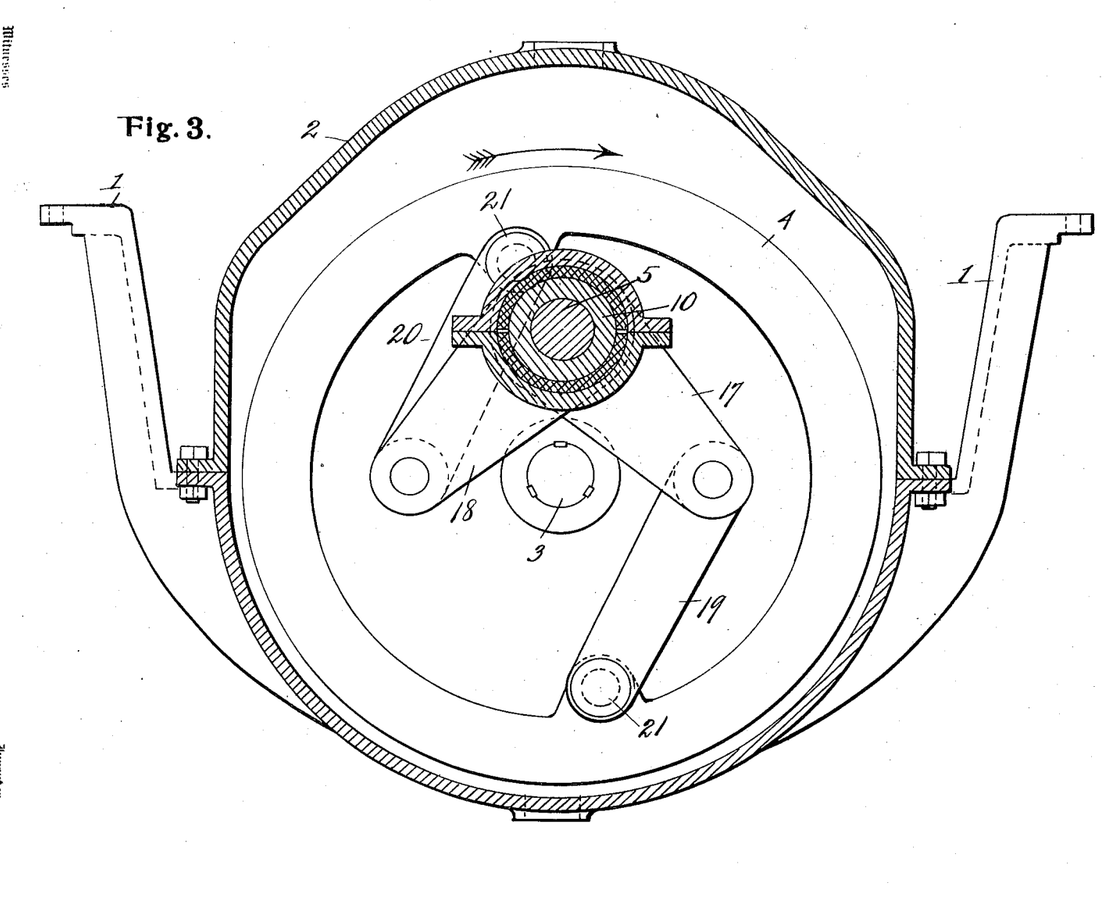
Fig. 3 is a transverse section through the casing and concentric shafts, as on line 3—3 of Fig. 2.

Referring to the characters of reference, 1 designates a suitable supporting frame at the rear of which is a case 2 into which extends one end of the driven shaft 3 carrying the fly wheel 4. Journaled in the frame is a solid shaft 5 upon which is mounted to rotate therewith a circular disk 6 having at its periphery a laterally extending flange 7 which forms the circular perimeter of the cylinder, and which is provided with the heat radiating fins 8. Formed integral with and projecting laterally from the inner face of the disk 6 concentric with the perimetrical flange or wall 7 is a circular flange 9. Mounted to rotate upon the shaft 5, and extending longitudinally thereof, is a hollow concentric shaft 10 which is suitably journaled in the frame, and to which is fixed a circular disk 11 which represents the rear side of the engine as opposed to the disk 6 which represents the front side thereof. The rear disk 11 has perimetrical contact with the inner wall of the flange 7 of the disk 6 in a manner to allow of a relative movement between said disks which are held together by means of a ring 12 secured to a part of the flange 7 by screw bolts 13, said ring bearing against a portion of the outer face of the disk 11, as clearly shown in Figs. 1 and 2, to effect a tight closure between said parts. Formed integral with and projecting laterally from the inner face of the rear disk 11 is a circular flange 14 which is concentric with the flange 9 and lies therein. Between the inner faces of the disks 6 and 11, and between the concentric faces of the flanges 7 and 9, is formed the cylinder or combustion chamber 15 of the engine, while between the inner faces of said disks, and between the circular flange 14 and the hollow shaft 10 is formed the circular compression chamber 16 of the engine. Upon the inner ends of the concentric shafts 5 and 10 are the crank arms 17 and 18 respectively which are connected by the respective links 19 and 20 with the diametrically opposed wrist pins 21 on the fly wheel 4. It will be noted that shaft 3 carrying said fly wheel is eccentric to the concentric shafts 5 and 10.

Bolted at 22 to the inner face of the front disk 6, so as to lie within the circular combustion chamber or cylinder, is a sector A which in transverse section is co-extensive with the transverse area of said cylinder, and also bolted at 23 to the inner face of the front disk 6 is a sector B which lies within the compression chamber 16 and is co-extensive therewith in transverse area. The sector B is provided with a chamber 24 which opens into the compression chamber through one end thereof. Leading from said chamber is a passage 25 opening through the periphery of said sector. It will be noted that the sectors A and B together with the flanges 7 and 9 are carried upon and turned in unison with the front disk 6, and also with the shaft 5 with which said disk is connected. Lying within the cylinder or combustion chamber 15 is a sector C which is bolted at 26 to the inner face of the rear disk 11, and which is co-extensive in transverse section with the transverse area of said cylinder. Within the compression chamber and bolted at 27 to the inner face of the rear disk 11 is a sector D which in transverse section is co-extensive with the transverse area of said compression chamber. Like sector B the sector D is provided with a chamber 28 which communicates through one end thereof with the compression chamber, and from which leads a passage 29 opening through the periphery of said sector.

It will be noted that sectors C and D together with flange 14 are carried upon and rotated in unison with the disk 11, and also with the shaft 10 with which said disk is connected. Formed through the flange 9 are the ports 30 and 31, and formed through the flange 14 are the ports 32 and 33. Formed ing with the compression chamber are the intake ports 34 and 35. Also formed through the rear disk 11 are the exhaust ports 36 and 37 which communicate with the cylinder 15. In the ring 12 are the ports 36$^a$ and 37$^a$ which, by the rotation of said parts are caused to alternately register with the ports 36 and 37 during the period of exhaust.

Figure 8:
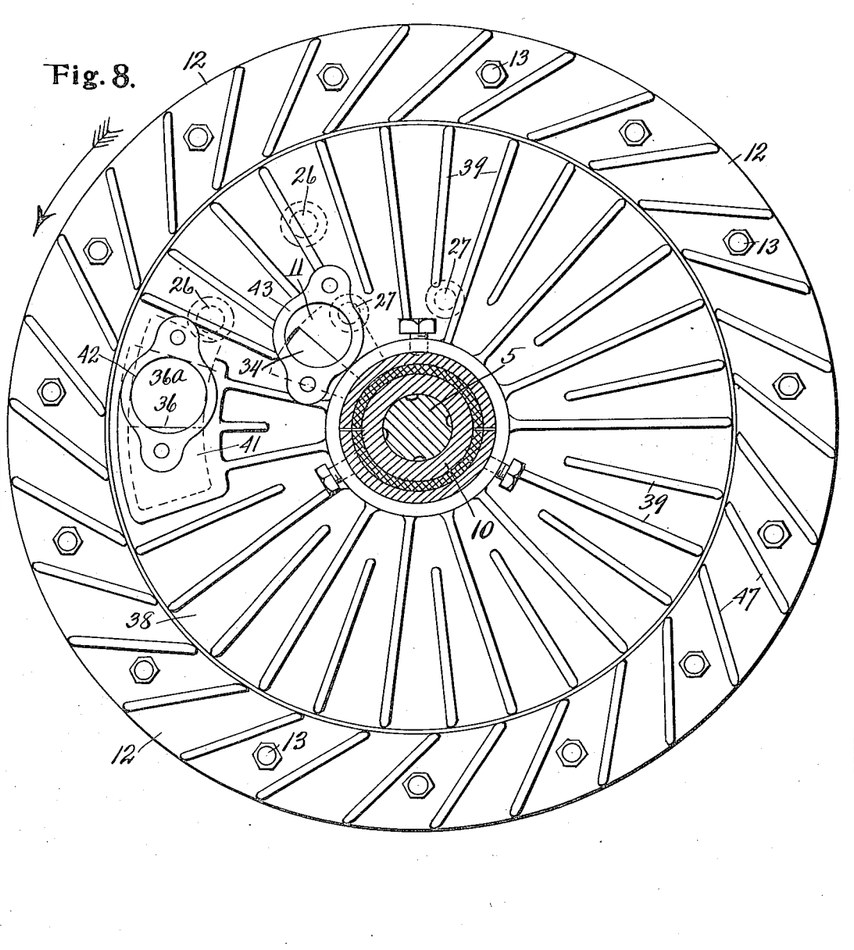
Fig. 8 is a transverse section as on line 8—8 of Fig. 2.
Figure 9:
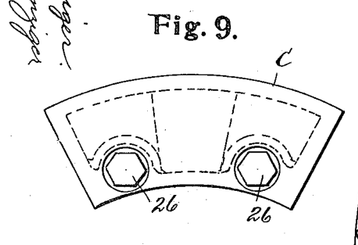
Fig. 9 is a side elevation of one of the piston sectors.
Figure 10:
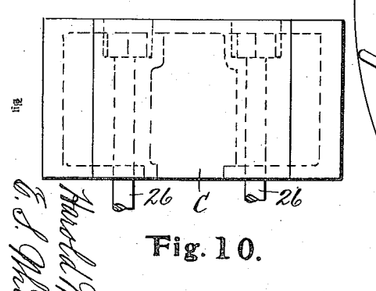
Fig. 10 is an inverted plan thereof.
Figures 11, 12, 13:
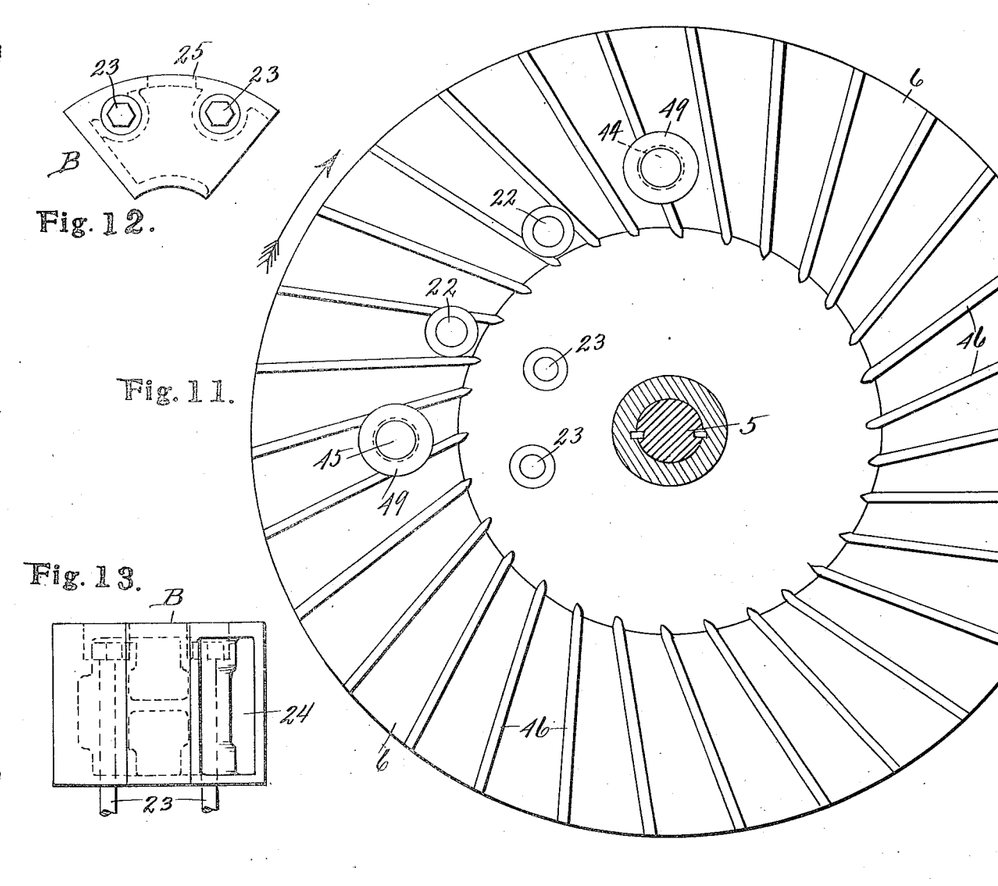
Fig. 11 is a front elevation of the engine with the concentric shafts in section, as on line 11—11 of Fig. 1.
Fig. 12 is a side elevation of one of the charge forming or compressing sectors working in the compression chamber.
Fig. 13 is an inverted plan thereof.

Mounted upon the frame and embracing a portion of the outer faces of the rear disk 11 and the ring 12 is a fixed disk 38 having thereon radially disposed heat radiating fins 39. On the rear face of the fixed disk 38 is a housing 40 (see Figs. 1 and 8) having therein an exhaust chamber 41 which is adapted, as the rear disk 11 revolves, to be successively placed in communication with the combustion chamber or cylinder through the exhaust ports 36 and 37, and the ports 36$^a$ and 37$^a$ in the ring 12 registering therewith, the exhaust escaping from the chamber 41 of said housing through the port 42. (See Fig. 8.) Also formed through the fixed disk 38 is an intake opening 43 to which may be connected a carbureter, not shown, or any other suitable source of explosive mixture, and which, as the disk 11 revolves, is made to successively communicate with the intake ports 34 and 35 therein communicating with the compression chamber.

The sectors A and C serve alternately as the power developing piston and the abutment for said piston. Said sectors being each connected independently with its shaft, and said shafts being each connected by means of a crank and link with the fly wheel of the driven shaft, said last mentioned shaft is successively driven by said sectors as they are alternately brought into use as the power developing piston.

Sectors B and D serve as compression sectors through the operation of which the explosive charge is initially compressed so that it may be introduced into the explosive cylinder from the compression chamber. The movement of the sector which effects such compression of the charge serving also to draw through the intake port at that time in communication with the source of explosive mixture a succeeding charge to be subsequently compressed by the compression travel or movement of the succeeding sector.

At the instant a charge is exploded to impel a sector piston through the arc of the cylinder the position of parts connecting said sector with the driven shaft is such that a long leverage is exerted by said sector over said shaft, causing the power developing sector to describe within the cylinder an arc representing 270°, while the other sector connected with the driven shaft is on the short end of the lever formed by the parts therefore describes an arc of but 90°, the arrangement being such that during the first half of a fly wheel revolution one sector makes a relatively large angular movement while the other makes a relatively small angular movement, and during the second half the two sectors reverse their relative movements, the one going slow during the first half making a quick movement during the second half, and vice versa, the vibratory movement of the sectors and concentric shafts turning the driven shaft at a constant velocity.

Figures 4, 5:
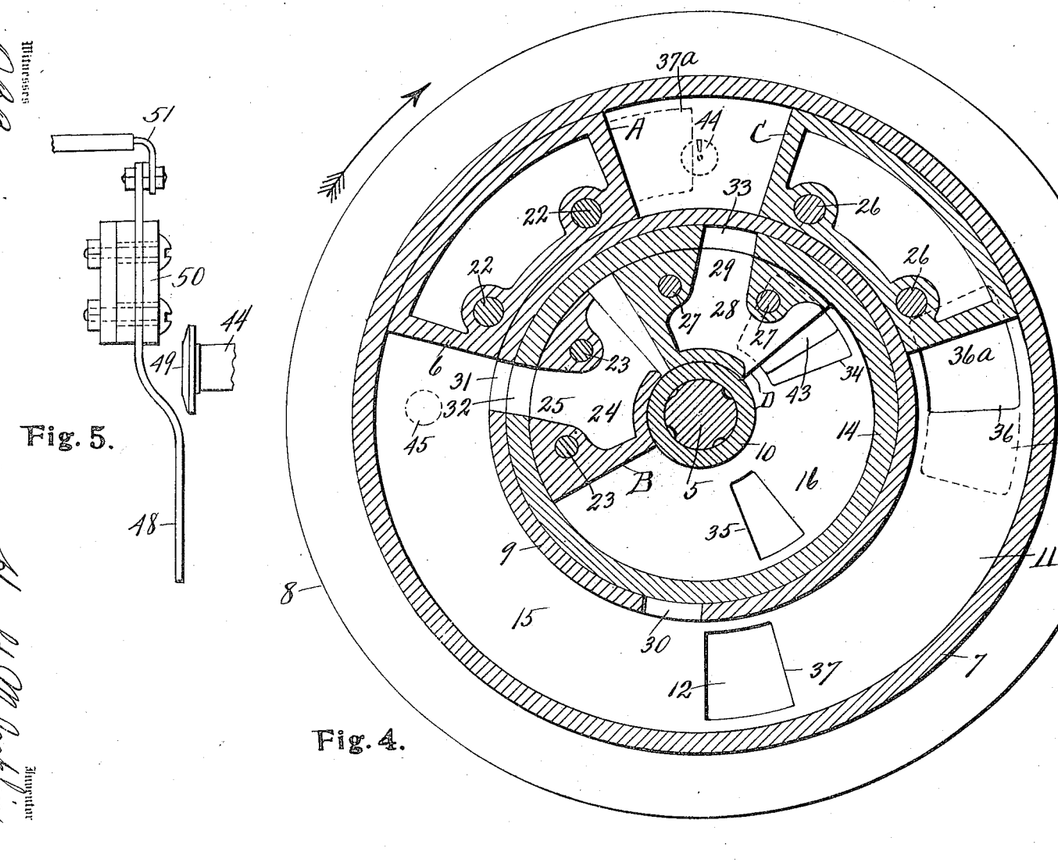
Fig. 4 is a transverse section through the engine as on line 4—4 of Fig. 2, illustrating the position of parts at the instant of explosion.
Fig. 5 is a fragmentary view in detail of the means employed for closing the ignition circuit through the spark plugs.

In describing the operation we will assume that the parts are in the position shown in Fig. 4, at which time there will be a compressed charge between the adjacent ends of the sectors A and C which is exploded by a spark from the spark plug 44 being one of two carried upon the front disk 6 and communicating with the combustion chamber. The energy created by the exploded charge drives the sector C around the cylinder three-quarters of a turn, while the sector A which serves as an abutment for the sector C moves through the circular cylinder one-quarter of a turn to the position occupied by sector C before the instant of explosion. This movement of sector C turns the driven shaft one-half of a revolution. The succeeding explosion which is caused by current through spark plug 45 drives the sector A around the cylinder three-quarters of the distance thereof, while sector A moves to the position occupied by sector C, thereby completing the cycle of movement and turning the driven shaft one revolution during two explosions in the cylinder or combustion chamber. The position of parts after completing one-half of a cycle of movement from the position shown in Fig. 4 is illustrated in Fig. 7, while the intermediate position, after an explosion has impelled the sector piston C a portion of the distance which it travels after one impulse, is illustrated in Fig. 6.

The explosive charges which are successively admitted to the cylinder 15, or explosion chamber, are formed in the chamber 16 and discharged into said explosion chamber in the following manner, reference being again had to Fig. 4 wherein we will assume the piston or sector A has just been impelled to the position in which it is shown by an exploded charge, and in reaching said position has traversed three-quarters of the circle of the cylinder, and that sector B has moved with it. This travel of sector B in the compression chamber 16 not only draws into said chamber an explosive mixture through the ports 34 and 43 which are caused to register while said sector B is traveling fast through the larger arc of the circle it describes, but also compresses the charge previously drawn into said compression chamber by the movement of sector D and which is confined between the sectors B and D, such compressed charge being allowed to escape from between said sectors at the instant of highest compression when the ports 31 and 32 are brought into registration with the passage 25 leading from the chamber 24 in the sector B, allowing the compressed charge to pass into the cylinder 15 and sweep from it the burned gases through the exhaust port 36 in the disk 11, the port 36ª in the ring 12, and the outer exhaust port 42 in the housing 40, thereby placing in the combustion chamber a charge of explosive mixture which occupies the greater arc of said cylinder between the sectors A and C. At this point in the travel or movement of the parts a succeeding explosion takes place impelling the piston or sector C throughout the greater arc of the cylinder to carry with it the compression sector D which compresses in the chamber 16 the charge drawn into it by the previous travel of the sector B.

Figure 6:
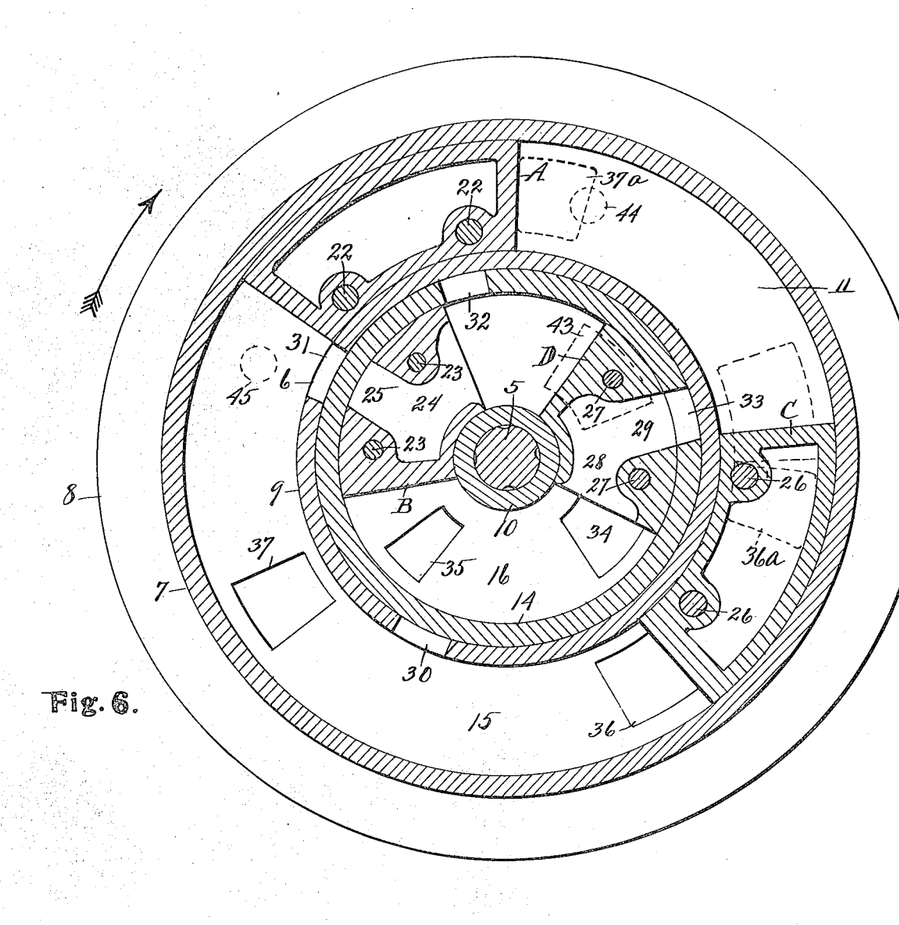
Fig. 6 is a transverse section similar to Fig. 4 showing the position of parts immediately following an explosion, with one of the sector pistons making a power stroke, illustrating the operation of compressing a charge for a succeeding explosion, and also illustrating the operation of drawing a new charge into the inner compression chamber.
Figure 7:
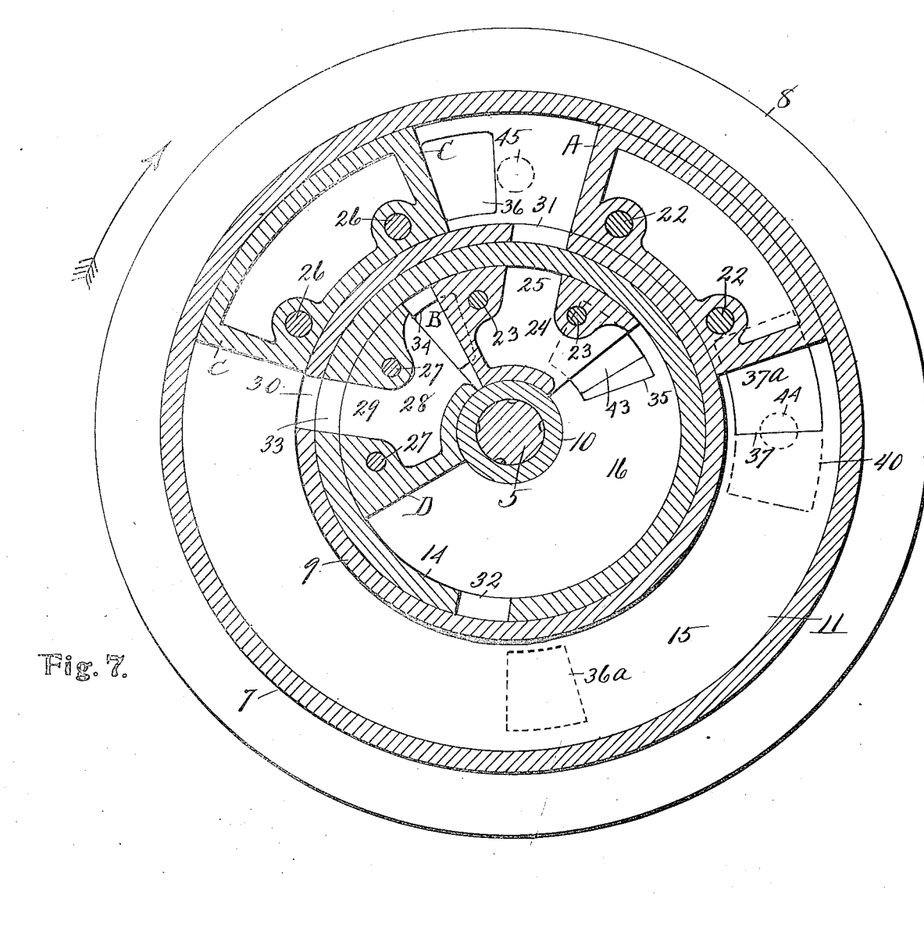
Fig. 7 is a transverse section similar to Fig. 4, showing a complete transposition of the parts from the position shown in Fig. 4, wherein the power developing sector of Fig. 4 becomes the abutment, and the abutment sector of Fig. 4 becomes the power developing sector.

As the sectors C and D are caused to move rapidly under the impulse of the explosion the exhaust port 36 and port 36ª in ring 12 close as well as the intake port 43, while the port 31 is closed by the movement of the flange 14, as clearly shown in Fig. 6. As the travel of the parts causes the position of the sectors to change, the charge which has been admitted to the combustion chamber is compressed by the rapid travel of the sector C between the end thereof and the end of sector A, while sector D will have drawn a succeeding charge into the compression chamber through the intake ports 35 and 43, and the charge compressed between the sectors D and B will be admitted to the combustion chamber through the registration of the ports 30 and 33 with the passage 29 leading from the chamber 28 in the compression sector D, the previously exploded charge being allowed to escape through the exhaust port 37 and port 37ª in ring 12 which are at that time open through the concurrent travel of the rear disk 11 and the front disk 6 carrying said ring. It will be understood that as the sectors B and D travel with the rapidly moving pistons with which they are connected a partial vacuum is created in the compression chamber which has the effect of creating a strong inflow of the explosive mixture as soon as the intake port opens during each half cycle of movement, so that said charges are successively compressed between said sectors as they approach each other during their vibratory travel, said compressed charge being allowed to escape at the point of highest compression as the ports 30 and 33, and 31 and 32, are caused to register in succession at the terminal of each compression stroke, the arrangement being such that two charges of explosive mixture are introduced into the combustion chamber, compressed and exploded, for each cycle of movement.

The outer face of the front revolving disk 6 is provided with heat radiating fins 46 while the rear face of the ring 12 is provided with like fins 47. The rapid rotation of the disk 6 and the ring 12 tends to radiate the heat from the surface of the fins thereof, while the travel of the fins 47 past the ends of the heat radiating fins on the fixed disk 38 creates a draft of air from between the fins 39 which assists in exhausting the heat therefrom. The operation of drawing the explosive charge into the central compression chamber by suction, or the creation of a partial vacuum therein, assists in cooling the engine internally.

A spark is created in the spark plugs at the proper time through the medium of a contact spring 48, shown in Fig. 5, against which a head 49 on each spark plug is adapted to have frictional contact as the front disk carrying the spark plugs revolves, said spring being mounted on a suitable adjustable bracket 50, and having connected thereto a current wire 51.

Having thus fully set forth my invention, what I claim as new and desire to secure by Letters Patent, is:—

1. In a rotary engine, a rotary annular cylinder formed of independently rotatable parallel disks having laterally extending interengaging circular flanges, a sector piston on each of said disks lying in said cylinder, a shaft rigidly connected to each of said disks, said shafts being concentric and independently rotatable, an eccentric shaft, means connecting the concentric shafts independently with said eccentric shaft to turn the latter, and means for creating an impelling force between said sectors.

2. In a rotary engine, rotary members having laterally extending interengaging circular flanges forming an annular cylinder, vibratory sectors therein serving alternately as abutment and piston, concentric shafts, each of said shafts connected rigidly to one of said sectors, a driven shaft, means connecting said concentric shafts to said driven shaft to impart a constant rotation to the latter, means for introducing an explosive charge between the vibratory sectors to be compressed by the faster travel of the piston sector during its power stroke, and means for exploding said charge between said sectors at the point of highest compression.

3. A rotary engine comprising interengaging rotary members having laterally extending circular flanges forming an annular cylinder and a compression chamber concentric with respect to said cylinder, vibratory sectors in said cylinder alternately serving as sectors in said compression chamber, a central solid shaft, a concentric hollow shaft, a piston sector and a compression sector connected to said solid shaft, a piston sector and a compression sector connected to said concentric shaft, an eccentric driven shaft, means connecting the concentric shafts with said driven shaft to impart a constant rotation to the latter, means for admitting an explosive charge into the compression chamber between the compression sectors to be compressed by the travel of the faster moving sector, means for admitting said charge under pressure into the cylinder between the piston sectors to be compressed by the travel of the faster moving piston, means for exploding said charge at the point of highest compression, and a controlled exhaust for the escape of the burned gases.

4. In a rotary engine, rotary members having interengaging circular flanges forming an annular cylinder and a concentric compression chamber, vibratory pistons in said cylinder, vibratory compression sectors in said compression chamber, each of said compression sectors being connected to and movable with one of said pistons, concentric shafts to which said piston sectors and compression sectors are connected in pairs, an eccentric driven shaft, means connecting the concentric shafts to said driven shaft to turn the latter at a constant velocity, means for introducing an explosive charge into the compression chamber between the compression sectors to be compressed by the travel of the faster sector during the power stroke, movable ports between the compression chamber and cylinder adapted to register and admit a compressed charge from the compression chamber into the cylinder between the piston sectors to be compressed by the faster travel of the piston sector during the power stroke, means for exploding said compressed charge to impart an impetus to the engine, and a controlled exhaust for allowing the burned gases to escape.

5. In a rotary engine, rotary members having interengaging flanges forming an annular cylinder, and a compression chamber within and concentric with said cylinder, movable sectors in the cylinder serving alternately as abutment and piston, movable sectors in the compression chamber, the sectors of the compression chamber and of the cylinder being connected in pairs to travel in unison, concentric shafts to each of which a pair of sectors is connected, an eccentric driven shaft, means connecting the concentric shafts with said driven shaft to turn the latter at a constant velocity, means for introducing an explosive charge into the compression chamber and compressing it between the sectors therein during each power stroke, means for allowing a compressed ber into said cylinder between the vibratory sectors therein to be compressed therebetween by the movement of the faster traveling sector acting as piston, means for igniting the compressed charge between the sectors in the cylinder, means for permitting the escape of burned gases, and means for controlling the exhaust.

6. A rotary engine, comprising rotatable side disks, said disks having laterally projecting circular flanges coöperating to form an annular cylinder and a concentric compression chamber, a pair of piston sectors in the cylinder, a pair of compression sectors in the compression chamber, said piston sectors and compression sectors being mounted on said disks in pairs to travel in unison therewith, concentric shafts to each of which one of said disks is rigidly connected, an eccentric driven shaft to which the concentric shafts are connected to drive the latter at a constant velocity, means for introducing an explosive charge into the compression chamber between the compression sectors therein, the coöperating flanges of the disks separating the compression chamber and cylinder having registering ports which allow a charge under pressure to pass into the cylinder between the sector pistons therein, said ports afterward closed by the travel of the parts, the travel of the piston sector compressing the charge thus introduced into the cylinder preparatory to the explosion thereof, means for exploding the charge in the cylinder under pressure, and a controlled exhaust for the escape of the burned gases.

7. In a rotary engine, independently rotatable parallel disks having laterally extending interengaging circular flanges forming in conjunction with said disks a rotary annular cylinder, a sector piston on each of said disks lying in said cylinder, a shaft rigidly connected to each of said disks, said shafts being concentric and independently rotatable, an eccentric shaft, a crank and link connection between each of said concentric shafts and said eccentric shaft to drive the latter, and means for creating an impelling force between said sectors.

In testimony whereof, I sign this specification in the presence of two witnesses.

HAROLD M. JACKLIN.

Witnesses:
H. J. DIETZ,
E. BELLE KIRK.